United States Patent [19]

Milz

[11] Patent Number: 4,860,532
[45] Date of Patent: Aug. 29, 1989

[54] METHOD FOR JOINING TOGETHER TWO SEGMENTS OF A SNOW-CHAIN, AND CONNECTING ELEMENT TO IMPLEMENT THE METHOD

[75] Inventor: Arthur Milz, Wald, Switzerland
[73] Assignee: Milz Produkte AG, Switzerland
[21] Appl. No.: 222,834
[22] Filed: Jul. 22, 1988
[30] Foreign Application Priority Data
  Jul. 24, 1987 [CH] Switzerland ............... 2827/87
[51] Int. Cl.4 ............................................. B21L 13/00
[52] U.S. Cl. ................................. 59/35.1; 59/30; 59/15; 59/84; 59/93; 474/218; 152/242
[58] Field of Search .................. 59/1, 3, 30, 83, 84, 59/93, 78, 10, 14, 15, 35.1; 474/218; 152/241, 242; 24/102 R, 116 A

[56] References Cited
U.S. PATENT DOCUMENTS

| | | | |
|---|---|---|---|
| 1,530,940 | 3/1925 | Herman | 59/84 |
| 1,769,876 | 7/1930 | Duncan | 59/84 |
| 1,981,394 | 11/1934 | Smith | 59/84 |
| 2,277,567 | 3/1942 | St Pierre | 59/84 |
| 2,398,898 | 4/1946 | St Pierre | 59/84 |
| 2,400,855 | 5/1946 | St Pierre | 59/84 |
| 2,421,789 | 6/1947 | Ingham | 59/3 |

*Primary Examiner*—David Jones
*Attorney, Agent, or Firm*—Osterlenk, Faber, Gerb & Soffen

[57] ABSTRACT

Two chain segments of a snow-chain are connected through elongated elements, where both ends of an element each exhibit an open slot in which a link of a chain segment is introduced. Thereafter, the slots are pressed shut until the chain links are at least formlocked, or even forcelocked therein. The method enables one to make the connection elements out of the same material as the one used for the chain segments, and to temper them together with the latter. Futhermore, the method can easily be performed by robots.

17 Claims, 1 Drawing Sheet

METHOD FOR JOINING TOGETHER TWO SEGMENTS OF A SNOW-CHAIN, AND CONNECTING ELEMENT TO IMPLEMENT THE METHOD

FIELD OF THE INVENTION

Most antiskid-chains for vehicles, which will be called snow-chains for short in what follows, comprise branching points in which several chain segments formed of links with a round or rectangular section are joined together. The way in which this junction is realized raises many problems of which only a few will be briefly mentioned here: excessive wear of the connecting element, capsizing or rolling action of the same when the brakes are applied on the vehicle, complicated manufacture of the connecting element, necessity to make it of a material which is different from that used for the chain elements, which entails that once the connection is made a useful tempering of the chain elements together with the connecting segments is no longer possible, and so on.

DESCRIPTION OF THE PRIOR ART

The Swiss Patent No. 654,532 proposes a solution which, although it has proved useful in practice, still requires that the connecting element be made of a material which is different from that used for the manufacture of the chain segments which must be joined. Furthermore, it is fairly complicated to make the connection, and this process is difficult to automatize. The invention relates to a process for joining together two segments of a snow-chain, which method is simple enough to be easily automatized, and at the same time ensures that the snow-chain will have the desired characteristics in use. Additionally, the invention proposes a connecting element which is adequate for performing said method, and which gives the snow-chain a good tracking ability. To this end, the invention is defined as recited in claims 1, 6 and 9.

BRIEF DESCRIPTION OF THE DRAWINGS

In what follows, the invention will be further illustrated by a preferred embodiment of the same, and with the help of the drawing, in which.

DESCRIPTION OF A PREFERRED EMBODIMENT

Figure 1:
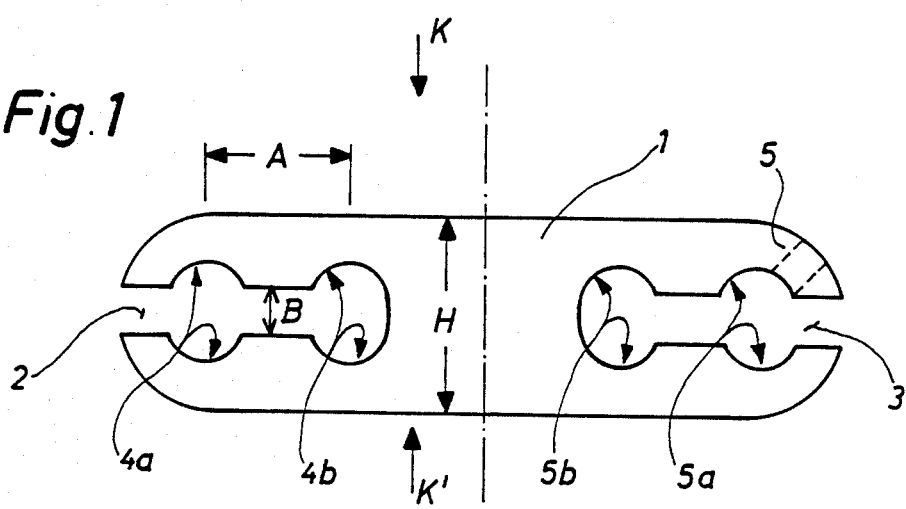
FIG. 1 shows a connecting element before the junction is made.

FIG. 1 shows a connecting element in its original shape, before the junction is made. The connecting element is blanked from a sheet metal, preferably of the same composition as the material from which the chain elements to be connected are made. The connecting element can be blanked from a sheet metal which has a thickness equal to 1 or 2 times that of the links from which the chain segments are made, but other thicknesses are also possible. At each of its ends, the connecting element 1 has an openmouthed slot 2, 3, and it should be noted that the mouth of the slots need not be axial to the element, as shown in the figure, but may also have a skew orientation, as shown in broken lines and identified by the cipher 5. Each slot exhibits a pair of recesses or bights, 4a, 4b and 5a, 5b, respectively. The width B of the slot at the places where it is not enlarged is at least as great as the rated thickness D of the chain segments to be joined (confer FIG. 3). The distance A between two recesses which belong to the same slot, is about equal to the overall width of either chain segment less the rated thickness of a link, so that after a link or a chain segment has been pushed into a slot (as shown in FIG. 3), each side of a link lies in one of the recesses. After one link has been pushed into each slot, the connecting element 1 is upset by the application of two opposed forces K, K' until one obtains approximately the shape shown in FIG. 2.

Figure 2:
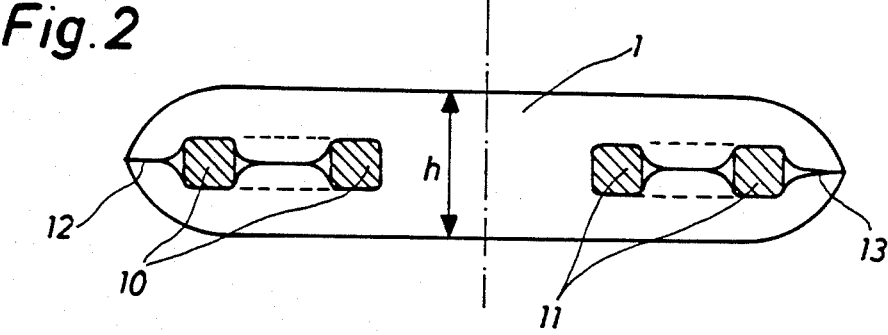
FIG. 2 shows a cross-section of the connecting element after the junction has been made.
Figure 3:
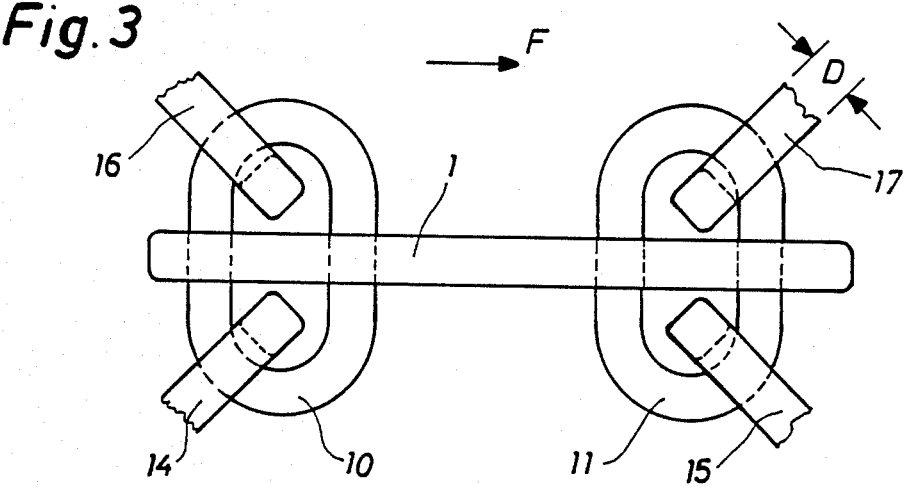
FIG. 3 shows a plane view of the connecting element with the chain links confined therein.

FIG. 2 shows how two chain links 10, 11, which belong to different chain segments, are constrained within the connecting element 1 through a deformation of the same. One sees that the original height H of the connecting element has shrunken to the smaller value h. This is achieved through application of the forces K, K' throughout the whole length of the connecting element. This results in a preferred embodiment of the invention, because it provides an extremely strong connection; however, it would also be possible to close the slots through a plastic deformation of the connecting element which for instance lets its overall height in its central region practically unchanged.

The forces K, K' may be so large, that after the deformation the links are not only formlocked in the connecting element, but also forcelocked in it. If necessary or desirable, the outer lips 12, 13 of the slots may be shut by welding or glueing after the deformation.

FIG. 3 shows a plane view of a connection, where the connecting element 1 joins a first chain segment with the links 10, 14, 16 to a second chain segment, which comprises the links 11, 15, and 17. One should note that it is advantageous to give a number of connecting elements an orientation, such that when the snow-chain is mounted on a tire for use the longitudinal direction of these connecting elements is parallel to the direction F in which the tire rolls, as indicated by an arrow in FIG. 3. This improves the transversal stability of the tire on which the snow chain is mounted.

I claim:

1. A method of uniting two links, each link being included in a respective segment of a chain, the method comprising:

providing a first link of one chain segment and a second link of a second chain segment, said links of said chain segments having a width and length each of the first and second links comprising a closed loop including two opposite side legs, said opposite side legs having a width and length; providing an elongated connecting element having an elongated slot at each longitudinal end defined by and between opposite sides of the connecting element, each slot being initially open toward the respective longitudinal end of the element defining link entry mouths, each slot having a width at least as wide as the width of the legs of the link to be received in the slot and a length greater than the width of said links of said chain segments;

introducing one of the links into each slot far enough that both opposite legs of the one link are in the slot;

thereafter compressing the opposite sides of the element against the legs of the link in each slot until the legs in the slot are restrained in the slot by the sides of the element.

2. The method of claim 1, comprising compressing both slots simultaneously through applying pressure in the direction of the width of the slots from one side of the connecting element to the other side, the applied pressure being strong enough to plastically deform the connecting element over the legs of the links.

3. The method of claim 2, wherein the pressure is applied until the originally open link entry mouths of the slots are closed.

4. The method claim 1 wherein, after application of the pressure the originally open mouths of the slots are closed by welding.

5. The method claim 1, wherein after the compression of the slots, hardening the connecting element together with the chain segments.

6. A connecting element for connecting two separated links of chain said separated links having a width and length; wherein each link comprises a loop having two opposite legs; the connecting element including two ends and having a respective slot defined by and between opposite sides of the connecting element, said slots extending in from each of the two ends of the connecting element a distance to receive the width of one of the links; at least one of the slots in the connecting element is defined by respective facing walls of the opposite sides of the connecting element said at least one of said slots comprising two recesses defined in each of said facing walls in an opposing manner, the distance in from the end of the slot between the centers of the recesses being substantially equal to the external width of the respective chain link in the slot, less its rated thickness.

7. The connecting element of claim 6, wherein the connecting element is blanked out from sheet metal.

8. The connecting element of claim 6, wherein the connecting element is comprised of the same material as the chain links to be connected.

9. Connecting element of claim 7, wherein the connecting element is comprised of the same material as the chain links to be connected.

10. A chain comprising two separated links of chain, said links having a width and length; each link comprising a loop with two opposite legs, said legs having a width and length;

an elongated connecting element for connecting the separated links of chain, the elongated connecting element having longitudinal ends and having a respective elongated slot at each end thereof and defined by and between opposite sides of the connecting element, each slot for receiving a respective one of the links; the slots being initially open toward the respective end of the element and having a width at least as wide as the width of the opposite legs of the respective link and a length greater than the width of said chain links;

the links being positioned in the respective slots far enough that the two legs are in the slot, and the connecting element being compressed to close the sides of the connecting element on both legs of each of the links.

11. The chain of claim 10, wherein the slots are welded closed.

12. The chain of claim 10, wherein the chain links and the elongated connecting element are hardened together.

13. The chain of claim 10, wherein at least one of the slots of the elongated connecting element comprises two recesses extending the width of the element through the slot, each slot being shaped for receiving a respective one of the legs of the chain link.

14. The chain of claim 13 wherein the distance between the centers of the recesses is substantially equal to the external width of the chain link less its rated thickness.

15. The chain of claim 13, wherein the connecting element is blanked out from sheet metal.

16. The chain of claim 15, wherein the connecting element is comprised of the same material as the chain links.

17. The chain of claim 13, wherein each of the links is part of a respective chain segment and each segment comprises a plurality of the links; the links of each chain segment being connected at a plurality of places to the other chain segment by the method of claim 11, and wherein at at least some of the places, the elongated connecting element is oriented in the direction in which the chain is driven when in use.

* * * * *